US009775156B2

(12) United States Patent
Yu et al.

(10) Patent No.: US 9,775,156 B2
(45) Date of Patent: *Sep. 26, 2017

(54) BEAM MISALIGNMENT DETECTION FOR WIRELESS COMMUNICATION SYSTEM WITH BEAMFORMING

(71) Applicant: MEDIATEK INC., Hsinchu (TW)

(72) Inventors: Chia-Hao Yu, Yilan County (TW);
Ming-Po Chang, New Taipei (TW);
Aimin Justin Sang, San Diego, CA (US)

(73) Assignee: MEDIATEK INC., HsinChu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/405,075

(22) Filed: Jan. 12, 2017

(65) Prior Publication Data

US 2017/0127400 A1 May 4, 2017

Related U.S. Application Data

(63) Continuation of application No. 14/863,492, filed on Sep. 24, 2015, now Pat. No. 9,578,644.
(Continued)

(51) Int. Cl.
*H04M 1/00* (2006.01)
*H04W 72/04* (2009.01)
(Continued)

(52) U.S. Cl.
CPC ......... *H04W 72/046* (2013.01); *H04W 16/28* (2013.01); *H04W 48/20* (2013.01)

(58) Field of Classification Search
CPC H04L 5/0057; H04W 72/046; H04W 72/085; H04W 88/02; H04W 88/08
(Continued)

(56) References Cited

U.S. PATENT DOCUMENTS 6,118,773 A 9/2000 Todd .............................. 370/334
6,983,167 B2 * 1/2006 Adachi .................. H01Q 1/246
370/322
(Continued)

FOREIGN PATENT DOCUMENTS

CN 103378892 A 4/2012
CN 103596245 A 8/2012
(Continued)

OTHER PUBLICATIONS

International Search Report and Written Opinion of International Search Authority for PCT/CN2015/090768 dated Dec. 31, 2015 (11 pages).

*Primary Examiner* — Babar Sarwar
(74) *Attorney, Agent, or Firm* — Imperium Patent Works; Zheng Jin

(57) ABSTRACT

A method of beam misalignment detection for wireless communication system with beamforming is proposed. To identify a misaligned beam, a relative beam quality degradation is applied by comparing a dedicated beam quality with a reference beam quality. The reference beam favors similar transmission path as the dedicated beam, and has better mobility robustness. In one embodiment, the reference beam is an associated control beam of the dedicated beam. To detect beam misalignment, a first dedicated beam SINR is compared with a second associated control beam SINR.

13 Claims, 6 Drawing Sheets

Related U.S. Application Data

(60) Provisional application No. 62/055,689, filed on Sep. 26, 2014.

(51) Int. Cl.
*H04W 16/28* (2009.01)
*H04W 48/20* (2009.01)

(58) Field of Classification Search
USPC .......... 455/420–422.1, 436, 437, 442, 452.1, 455/63.4, 456.1; 370/328, 338, 310, 339, 370/334, 534, 464, 498; 375/295, 302, 375/303, 304, 315, 309
See application file for complete search history.

(56) References Cited

U.S. PATENT DOCUMENTS

| | | | | |
|---|---|---|---|---|
| 8,238,927 | B2* | 8/2012 | Saito | H04B 7/0491 370/431 |
| 2002/0098873 | A1* | 7/2002 | Alexiou | H04W 16/02 455/562.1 |
| 2002/0137538 | A1* | 9/2002 | Chen | H04B 7/0491 455/575.7 |
| 2003/0181163 | A1* | 9/2003 | Ofuji | H01Q 1/1257 455/25 |
| 2004/0224637 | A1 | 11/2004 | Silva et al. | 455/63.4 |
| 2005/0200524 | A1 | 9/2005 | Grandhi et al. | 342/374 |
| 2005/0202859 | A1 | 9/2005 | Johnson et al. | 455/575.7 |
| 2005/0221861 | A1* | 10/2005 | Zeira | H04B 7/0408 455/562.1 |
| 2005/0261028 | A1* | 11/2005 | Chitrapu | H04W 16/28 455/562.1 |
| 2006/0105771 | A1* | 5/2006 | Iacono | H04W 16/28 455/446 |
| 2008/0259731 | A1* | 10/2008 | Happonen | G10K 11/34 367/121 |
| 2010/0009635 | A1 | 1/2010 | Qin et al. | 455/63.4 |
| 2010/0150083 | A1* | 6/2010 | Toda | H04W 72/085 370/329 |
| 2011/0064010 | A1 | 3/2011 | Zhong et al. | 370/310 |
| 2011/0281600 | A1* | 11/2011 | Tanaka | H04B 7/024 455/500 |
| 2012/0062427 | A1 | 3/2012 | Wu | 342/450 |
| 2012/0093136 | A1* | 4/2012 | Julian | H04W 88/08 370/336 |
| 2012/0183102 | A1 | 7/2012 | Willingham et al. | 375/340 |
| 2013/0202054 | A1 | 8/2013 | Khan et al. | 375/259 |
| 2013/0295852 | A1* | 11/2013 | Kim | H04W 16/28 455/63.4 |
| 2014/0044044 | A1 | 2/2014 | Josiam et al. | 370/328 |
| 2014/0341310 | A1 | 11/2014 | Rahman et al. | 375/260 |
| 2015/0004918 | A1 | 1/2015 | Wang et al. | 455/73 |
| 2015/0141026 | A1 | 5/2015 | Jover | 455/452.1 |
| 2015/0222350 | A1 | 8/2015 | Shi | 342/367 |

FOREIGN PATENT DOCUMENTS

| | | |
|---|---|---|
| WO | WO2013039352 A2 | 9/2011 |
| WO | WO2013119039 A1 | 2/2012 |
| WO | WO2014027824 A1 | 8/2012 |

* cited by examiner

BEAM MISALIGNMENT DETECTION FOR WIRELESS COMMUNICATION SYSTEM WITH BEAMFORMING

CROSS REFERENCE TO RELATED APPLICATIONS

This application is a continuation, and claims priority under 35 U.S.C. §120 from nonprovisional U.S. patent application Ser. No. 14/863,492, entitled "Beam Misalignment Detection for Wireless Communication System with Beamforming," filed on Sep. 24, 2015, the subject matter of which is incorporated herein by reference. Application Ser. No. 14/863,492, in turn, claims priority under 35 U.S.C. §119 from U.S. Provisional Application No. 62/055,689, entitled "Beam Misalignment Detection for Wireless Communication System with Beamforming," filed on Sep. 26, 2014; the subject matter of which is incorporated herein by reference.

TECHNICAL FIELD

The disclosed embodiments relate generally to wireless communication, and, more particularly, to beam misalignment detection in a Millimeter Wave (mmW) beamforming system.

BACKGROUND

The bandwidth shortage increasingly experienced by mobile carriers has motivated the exploration of the underutilized Millimeter Wave (mmWave) frequency spectrum between 3G and 300G Hz for the next generation broadband cellular communication networks. The available spectrum of mmWave band is two hundred times greater than the conventional cellular system. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions.

With recent advances in mmWave semiconductor circuitry, mmWave wireless system has become a promising solution for real implementation. However, the heavy reliance on directional transmissions and the vulnerability of the propagation environment present particular challenges for the mmWave network. In general, a cellular network system is designed to achieve the following goals: 1) Serve many users with widely dynamical operation conditions simultaneously; 2) Robust to the dynamics in channel variation, traffic loading and different QoS requirement; and 3) Efficient utilization of resources such as bandwidth and power. Beamforming adds to the difficulty in achieving these goals.

Analog beamforming is a good candidate for application in mmWave beamforming wireless systems. It provides array gain for compensating severe pathloss due to harsh wireless propagation environment, and removes the need for training channel response matrix between multiple antenna elements at TX/RX sides. Different beamformers can have different spatial resolution. For example, a sector antenna can have shorter by wider spatial coverage, while a beamforming antenna can have longer by narrower spatial coverage. To provide moderate array gain, large number of array elements may be needed. In principle, beam training mechanism, which includes both initial beam alignment and subsequent beam tracking, ensures that base station (BS) beam and user equipment (UE) beam are aligned for data communication.

To ensure beam alignment, beam-tracking operation should be adapted in response to channel changes. Too fast tracking causes high overhead, too slow tracking causes beam misalignment. Beam tracking operation is analogy to link adaptation operation. For proper link adaptation operation, relevant channel state information (CSI) should be collected and provided to the scheduler (e.g., the base station). However, in mmWave systems, transmission path lifetime is expected one order of magnitude shorter than traditional cellular bands due to wavelength difference. Combined with dedicated beam with small spatial coverage, the number of effective transmission paths for a dedicated beam could be rather limited, thus more vulnerable to UE movements and environmental changes. Deciding and adapting CSI reporting periodicity thus becomes important. Similarly, it is desirable to enable beam misalignment detection for properly adapting the beam tracking operation in mmWave beamforming systems.

SUMMARY

A method of beam misalignment detection for wireless communication system with beamforming is proposed. To identify a misaligned beam, a relative beam quality degradation is applied by comparing a dedicated beam quality with a reference beam quality. The reference beam favors similar transmission path as the dedicated beam, and has better mobility robustness. In a preferred embodiment, the reference beam is an associated control beam of the dedicated beam. To detect beam misalignment, a first dedicated beam SINR is compared with a second associated control beam SINR.

In one embodiment, a UE establishes a connection with a BS over a trained and aligned dedicated beam. The dedicated beam has fine resolution with narrower beamwidth. The UE monitors the dedicated beam and determines a first beam quality. The UE monitors a reference beam and determines a second beam quality. The reference beam has a coarse resolution with a wider beamwidth. The UE determines a beam alignment status of the dedicated beam by comparing the first beam quality and the second beam quality.

In another embodiment, a BS establishes a data connection with a UE over a trained and aligned dedicated beam. The dedicated beam has fine resolution with narrower beamwidth. The BS obtains a first beam quality of the dedicated beam. The BS obtains a second beam quality of a reference beam. The reference beam has a coarse resolution with a wider beamwidth. The BS determines a beam alignment status of the dedicated beam by comparing the first beam quality and the second beam quality.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
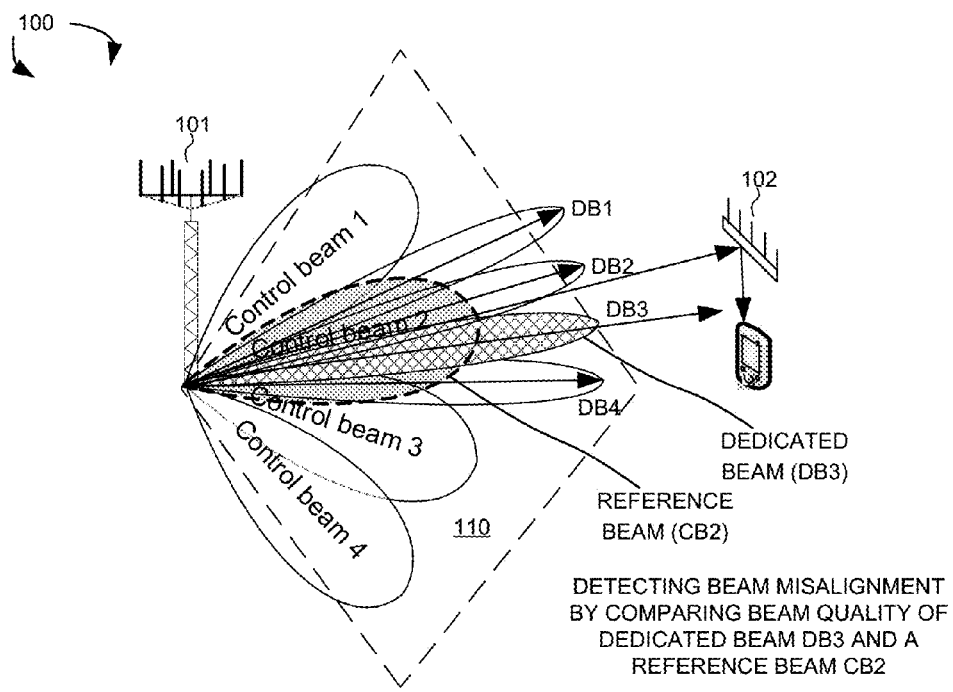
FIG. 1 illustrates control beams and dedicated beams in a beamforming wireless communication system in accordance with one novel aspect.

FIG. 1 illustrates control beams and dedicated beams in a beamforming Millimeter Wave (mmWave) cellular network 100 in accordance with one novel aspect. Beamforming mmWave mobile communication network 100 comprises a base station BS 101 and a user equipment UE 102. The mmWave cellular network uses directional communications with narrow beams and can support multi-gigabit data rate. Directional communications are achieved via digital and/or analog beamforming, wherein multiple antenna elements are applied with multiple sets of beamforming weights to form multiple beams. In the example of FIG. 1, BS 101 is directionally configured with multiple cells, and each cell is covered by a set of coarse TX/RX control beams. For example, cell 110 is covered by a set of four control beams CB1, CB2, cB3, and CB4. The collection of the control beams CB1-CB4 covers an entire service area of cell 110, and each control beam has a wider and shorter spatial coverage as depicted. Each control beam in turn is covered by a set of dedicated data beams. For example, CB2 is covered by a set of four dedicated data beams DB1, DB2, DB3, and DB4. The collection of the dedicated data beams covers a service area of one control beam, and each dedicated data beam has a narrower and longer spatial coverage as depicted.

The set of control beams are lower-level beams that provide low rate control signaling to facilitate high rate data communication on higher-level data beams. The set of control beams may be periodically configured or occur indefinitely and repeatedly in order known to the UEs. The set of control beams covers the entire cell coverage area with moderate beamforming gain. Each control beam broadcasts minimum amount of cell-specific and beam-specific information similar to System Information Block (SIB) or Master Information Block (MIB) in LTE systems. Each beam may also carry UE-specific control or data traffic. Each beam transmits a set of known signals for the purpose of initial time-frequency synchronization, identification of the control beam that transmits the signals, and measurement of radio channel quality for the beam that transmits the signals. The control beam and dedicated data beam architecture provides a robust control-signaling scheme to facilitate the beamforming operation in mmWave cellular network systems. Furthermore, different spatial paths offered by different levels of control beams and dedicated data beams result in different channel coherent time and fading dynamics. Multiple choices of spatial beams thus offer more spatial diversity to be explored in mmWave small cells.

In principle, beam training mechanism, which includes both initial beam alignment and subsequent beam tracking, ensures that BS beam and UE beam are aligned for data communication. To ensure beam alignment, beam-tracking operation should be adapted in response to channel changes. Too fast tracking causes high overhead, too slow tracking causes beam misalignment. Detecting beam misalignment and thereby properly adapting the beam-tracking operation is challenging. This is because beam misalignment and link variation are entangled from beam channel quality (e.g., SNR/SINR/CQI) perspective. Beam misalignment results in degraded SINR, while link variation also generates fluctuation SINR, making straightforward differentiation of the two effects challenging. To what level of degradation is accounted for beam-misalignment is thus difficult to define.

In according with one novel aspect, a relative SINR degradation is applied to identify beam misalignment for dedicated beam. The dedicated beam SINR is compared with a reference beam SINR in detecting beam misalignment. The reference beam favors a similar transmission path as the dedicated beam. The reference beam also shows better mobility robustness. In the example of FIG. 1, BS 101 and UE 102 communicates with each other via an initially aligned dedicated beam DB3. The associated control beam for DB3 is CB2, which has overlapping spatial coverage with DB3. In order to detect beam misalignment, the dedicated beam SINR of DB3 is compared with the reference beam SINR of CB2 such that a more accurate beam misalignment detection result can be achieved.

Figure 2:
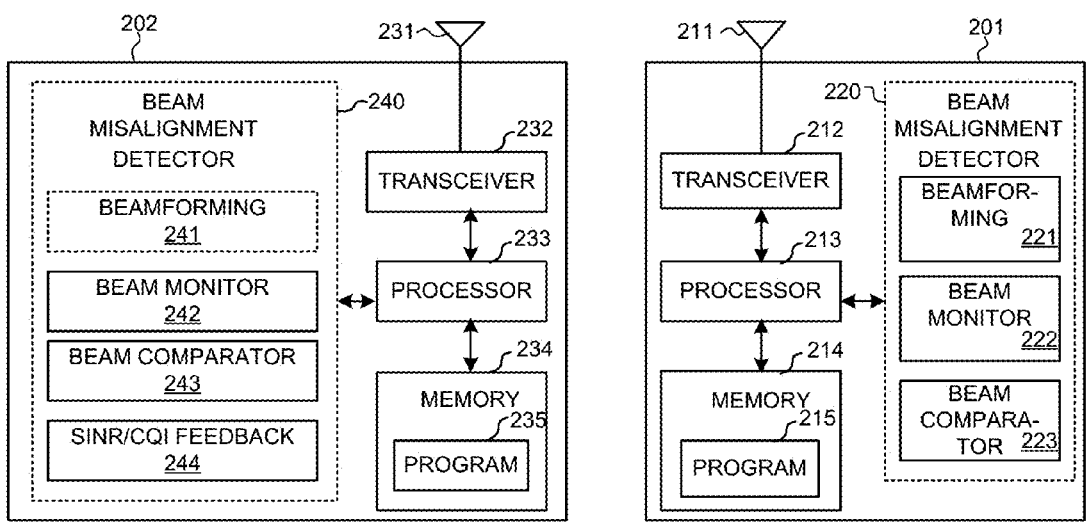
FIG. 2 is a simplified block diagram of a base station and a user equipment that carry out certain embodiments of the present invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules that carry out different tasks in accordance with embodiments of the current invention.

Similarly, UE 202 has an antenna 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules and circuits that carry out different tasks in accordance with embodiments of the current invention.

The functional modules are circuits that can be implemented and configured by hardware, firmware, software, and any combination thereof. For example, BS 201 comprises a beam misalignment detector 220, which further comprises a beamforming circuit 221, a beam monitor 222, and a beam comparator 223. Beamforming circuit 221 may belong to part of the RF chain, which applies various beamforming weights to multiple antenna elements of antenna 211 and thereby forming various beams. Beam monitor 222 monitors received radio signals and performs measurements of the radio signals over the various beams. Beam comparator 223 compares the beam monitoring results for each beam and determines beam alignment status.

Similarly, UE 202 comprises a beam misalignment detector 240, which further comprises a beamforming circuit 241, a beam monitor 242, a beam comparator 243, and a SINR/CQI feedback circuit 244. Beamforming circuit 241 may belong to part of the RF chain, which applies various beamforming weights to multiple antenna elements of antenna 231 and thereby forming various beams. Beamforming circuit 241 is optional for UE side, because UE 202 can use omni beam instead. Beam monitor 242 monitors received radio signals and performs measurements of the radio signals over the various beams. Beam comparator 243 compares the beam monitoring results for each beam and determines beam alignment status. SINR/CQI feedback circuit 244 provide beam quality feedback information to BS 201 for beam alignment status determination.

Figure 3:
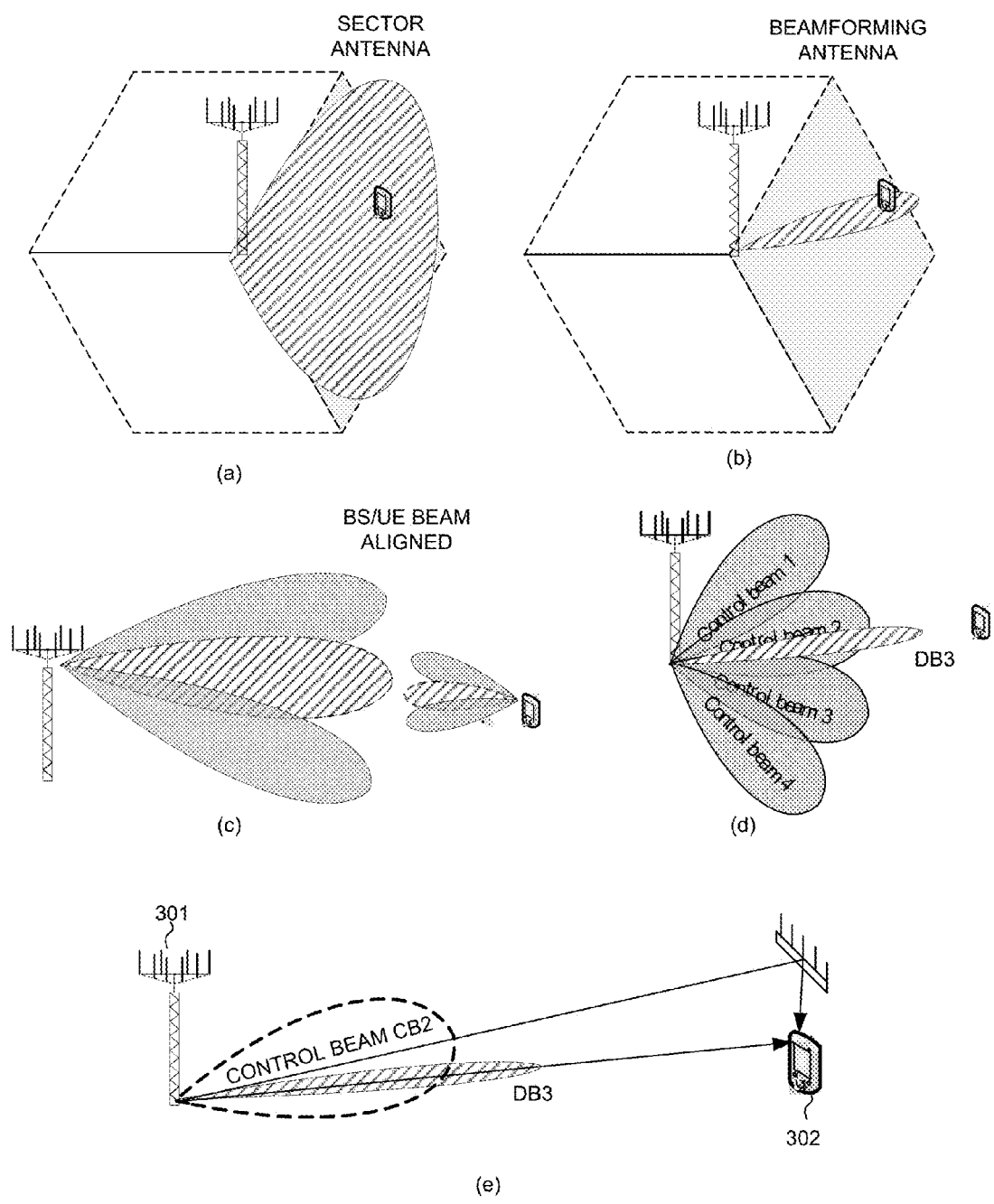
FIG. 3 illustrates beam misalignment detection utilizing both control beam transmission and dedicated beam transmission.

FIG. 3 illustrates beam misalignment detection utilizing both control beam transmission and dedicated beam transmission. Different beamformers can have different spatial resolution, i.e., beamwidth. For example, a sector antenna depicted in (a) can have lower array gain but wider spatial coverage, while a beamforming antenna depicted in (b) can have higher array gain but narrower spatial coverage. In principle, beam-training mechanism ensures that BS beam and UE beam are aligned for data communication as depicted in (c). Beam training includes initial beam alignment and subsequent beam tracking. At a BS side, a sector/cell is served by a manageable number of coarse control beams, e.g., control beam 1 to control beam 4. Other finer-resolution BS beams are termed dedicated beams that need to be trained before usage, e.g., dedicated beam DB3, as depicted by FIG. 3(d).

In the example of FIG. 3(e), BS 301 and UE 302 communicate with each other via an initially aligned dedicated beam DB3. The associated control beam for DB3 is CB2, which has overlapping spatial coverage with DB3. To ensure beam alignment, beam-tracking operation should be adapted in response to channel changes, e.g., to ensure that DB3 is aligned when the beamformed channel changes over time. However, solely monitoring the SINR of DB3 for beam misalignment detection is challenging, if not impossible. This is because beam misalignment and link variation are entangled from beam channel quality perspective. Beam misalignment results in degraded SINR. Link variation also generates fluctuating SINR, making straightforward differentiation of the two effects challenging.

In mmWave systems, the beamformed mmWave channel coherence time and beam direction coherence time is not easily characterized. Before beamforming, link variation timescale could be one to two orders smaller than beam direction variation. Beam direction is more of a long-term channel statistics. Short-term link variation thus needs to be filtered off to find the effect of beam misalignment. However, even the coherence time for link variation and beam direction are different, it is still challenging to isolate the two effects. It is complex to define the timescale of "long-term" filtering on SINR for isolating beam alignment effect, especially in mobility-varying cases. Besides, it may be related to timescale of, e.g., shadowing, which then indicates that the filtered value is still affected by channel variation and beam alignment. To what level of SINR degradation is accounted for beam-misalignment is thus difficult to define.

In accordance with one novel aspect, a relative SINR degradation is used by comparing dedicated beam SINR with a reference beam SINR to identify beam misalignment. The reference beam SINR should favor similar transmission path as the dedicated beam, and should show better mobility robustness. In the example of FIG. 3(e), the reference beam for DB3 is the associated control beam CB2. In a preferred embodiment, the current dedicated beam SINR1 is compared with the associated control SINR2 in determining beam misalignment.

Figure 4:
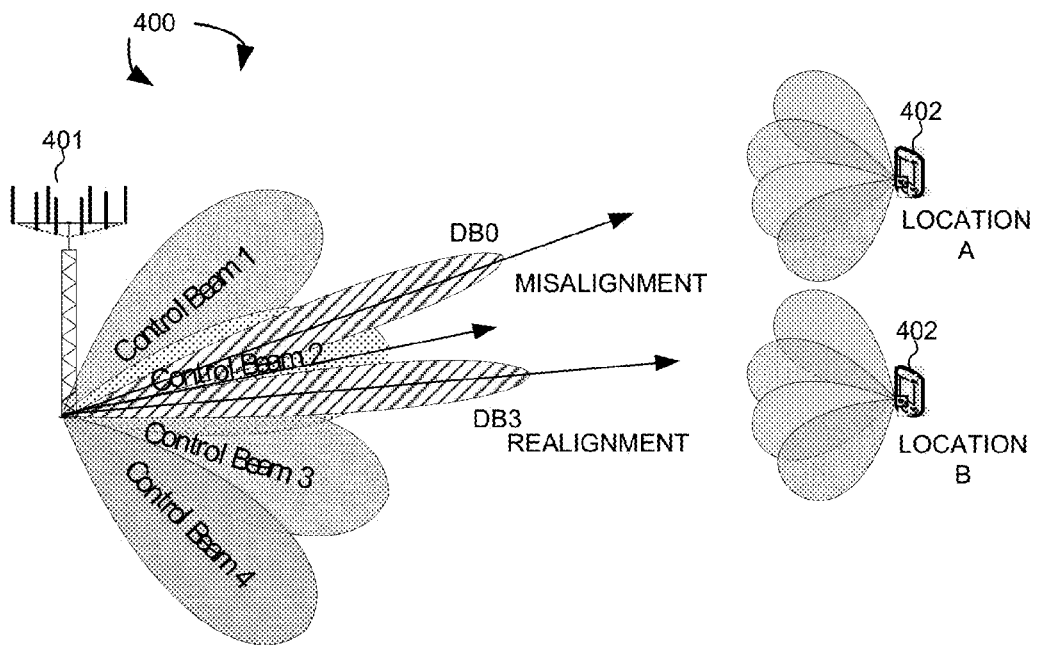
FIG. 4 illustrates a first example of beam misalignment detection in a beamforming system.

FIG. 4 illustrates a first example of beam misalignment detection in a beamforming network 400. Beamforming network 400 comprises a base station BS 401 and a user equipment UE 402. BS 401 is directionally configured with multiple cells, and each cell is covered by a set of coarse TX/RX control beams, e.g., CB1 to CB4. Initially, UE 402 performs scanning, beam selection, and synchronization with BS 401 using the control beams. Later, a dedicated beam DB0 is trained and then used for data communication between BS 401 and UE 402. The associated control beam for DB0 is control beam CB2, which favors similar transmission path as DB0. For beam misalignment detection, both beam quality for DB0 and beam quality for CB2 are monitored. The dedicated beam DB0 provides higher array again than the control beams. When DB0 is aligned, the dedicated beam SINR1 is higher than the reference beam SINR2 (e.g., at location A). However, when SINR1 is merely comparable with SINR2, then beam misalignment is very likely (e.g., at location B). When UE 402 moves from location A to location B, the SINR1 for DB0 degrades, while the SINR2 for CB2 remains about the same due to its wider angular spatial coverage. As a result, beam misalignment is very likely when SINR1 drops to be similar to or lower than SINR2. Once beam misalignment is detected, BS401 can realign the dedicated beam, e.g., train DB3 for data communication with UE 402.

Figure 5:
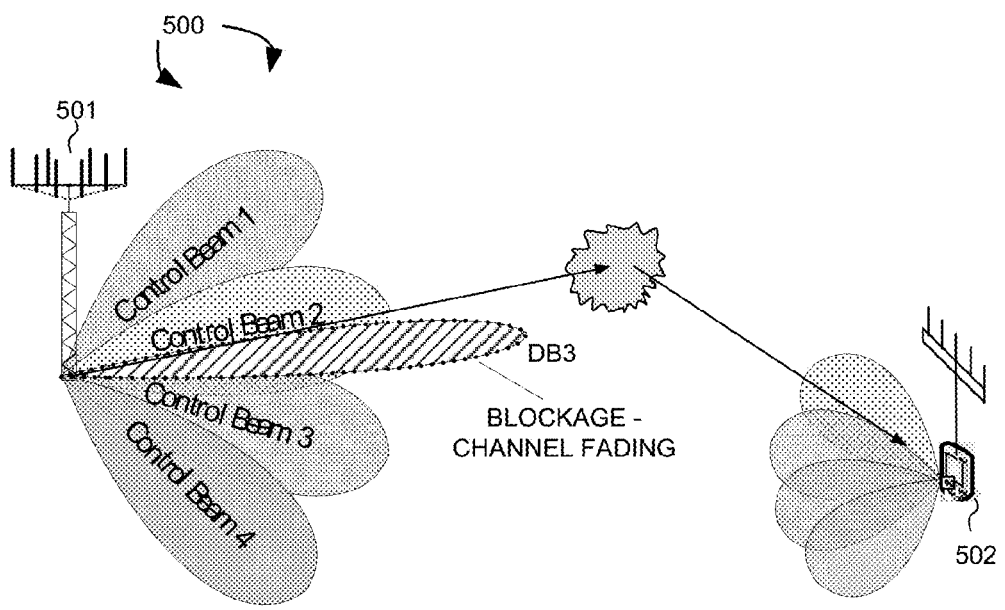
FIG. 5 illustrates a second example of beam misalignment detection in a beamforming system.

FIG. 5 illustrates a second example of beam misalignment detection in a beamforming network 500. Beamforming network 500 comprises a base station BS 501 and a user equipment UE 502. BS 501 is directionally configured with multiple cells, and each cell is covered by a set of coarse TX/RX control beams, e.g., CB1 to CB4. Initially, UE 502 performs scanning, beam selection, and synchronization with BS 501 using the control beams. Later, a dedicated beam DB3 is trained and then used for data communication between BS 501 and UE 502. The associated control beam for DB0 is control beam CB2, which favors similar transmission path as DB3. For beam misalignment detection, both beam quality for DB3 and beam quality for CB2 are monitored. In the example of FIG. 5, pedestrian trespassing behaves more like fading rather than beam misalignment. Because both control beam CB2 and dedicated beam DB3 are blocked simultaneously, both SINR1 for DB3 and SINR2 for CB2 degrade simultaneously. In such a case, because there is no beam misalignment, we do not need to change from dedicated beam DB3 to another dedicated beam, where both dedicated beams are associated with the same control beam CB2. However, if such blockage is long, then it is possible to change to another control beam (e.g., CB3) as fallback beam. Note that both SINR1 and SINR2 may be subject to filtering for results that are more representative. The SINR2 filtering window for CB2 can be potentially no smaller than SINR1 filtering window for DB3. This is because control beam is more multipath rich than dedicated beam.

For the above-illustrated beam misalignment detection, the basic assumption is that control beam is properly selected all the time. This is because control beam transmission periodicity is a system parameter and is designed to be entry-level beam for all users. Beam misalignment is not always detectable, but is only detected when its impact is severe. In general, it works for BS-side beam misalignment detection. It may also work for UE-side beam misalignment detection if UE-side beamforming is controlled by the BS. Furthermore, uplink-signaling support is required. For BS to perform misalignment detection itself, CQI information of relevant beams needs to be provided to the BS. For UE to perform misalignment detection, uplink signaling is required for indicating BS of beam alignment state. PHY/MAC layer signaling is favored for UE signaling of misalignment detection. The signaling can be combined with CSI reporting. On the other hand, RRC layer signaling has longer latency. If some value is to be attached to RRC layer, RRC filtering has longer filtering window.

Figure 6:
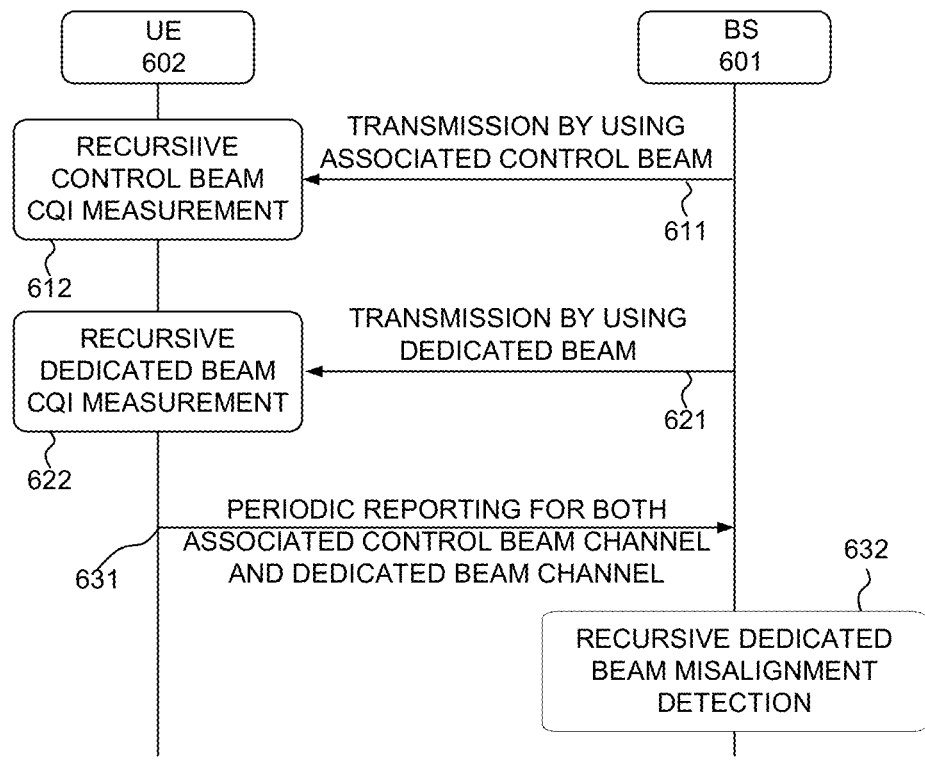
FIG. 6 illustrates a first embodiment of beam misalignment detection by a base station (BS) in a beamforming system.

FIG. 6 illustrates a first embodiment of beam misalignment detection by a base station (BS) in a beamforming system. BS 601 is directionally configured with a set of control beams, and has trained a dedicated beam for data communication with UE 602. In step 611, BS 601 periodically transmits downlink reference signals to UE 602 using an associated control beam. The associated control beam is a beam whose main beam is spatially overlapped with the main beam of the dedicated beam. Based on the control beam transmission, UE 602 recursively monitors and measures the control beam for CQI information (step 612). The CQI information may be subject to filtering based on a filtering window to remove short-term fading effect and to achieve a more representative result. In step 621, BS 601 periodically transmits downlink reference signals to UE 602 over the dedicated beam. Based on the dedicated beam transmission, UE 602 recursively monitors and measures the dedicated beam for CQI information (step 622). The CQI information may be subject to filtering based on a filtering window to remove short-term fading effect and to achieve a more representative result. Note that because control beam is more multipath-rich as compared to dedicated beam, the filtering window for control beam CQI is no smaller than the filtering window for dedicated beam CQI. In step 631, UE 602 periodically reports both the associated control beam channel CQI and the dedicated beam channel CQI to BS 601 via an uplink overhead channel. In step 632, BS 601 recursively performs dedicated beam misalignment detection by comparing the control beam channel quality and the dedicated beam channel quality.

Figure 7:
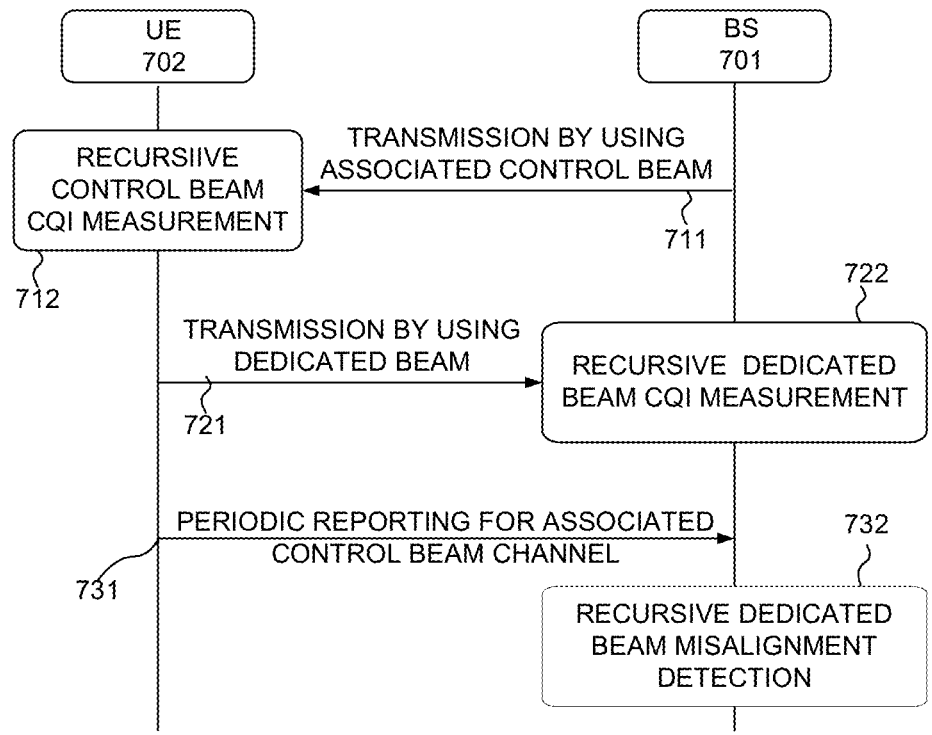
FIG. 7 illustrates a second embodiment of beam misalignment detection by a base station (BS) in a beamforming system.

FIG. 7 illustrates a second embodiment of beam misalignment detection by a base station (BS) in a beamforming system. BS 701 is directionally configured with a set of control beams, and has trained a dedicated beam for data communication with UE 702. In step 711, BS 701 periodically transmits downlink reference signals to UE 702 using an associated control beam. The associated control beam is a beam whose main beam is spatially overlapped with the main beam of the dedicated beam. Based on the control beam transmission, UE 702 recursively monitors and measures the control beam for CQI information (step 712). The CQI information may be subject to filtering based on a filtering window to remove short-term fading effect and to achieve a more representative result. In step 721, UE 702 periodically transmits uplink reference signals to BS 701 over the dedicated beam. Based on the dedicated beam transmission, BS 701 recursively monitors and measures the dedicated beam for CQI information (step 722). The CQI information may be subject to filtering based on a filtering window to remove short-term fading effect and to achieve a more representative result. Note that because control beam is more multipath-rich as compared to dedicated beam, the filtering window for control beam CQI is no smaller than the filtering window for dedicated beam CQI. In step 731, UE 702 periodically reports the associated control beam channel CQI to BS 701 via an uplink overhead channel (no dedicated beam channel CQI feedback). In step 732, BS 701 recursively performs dedicated beam misalignment detection by comparing the control beam channel quality and the dedicated beam channel quality.

Figure 8:
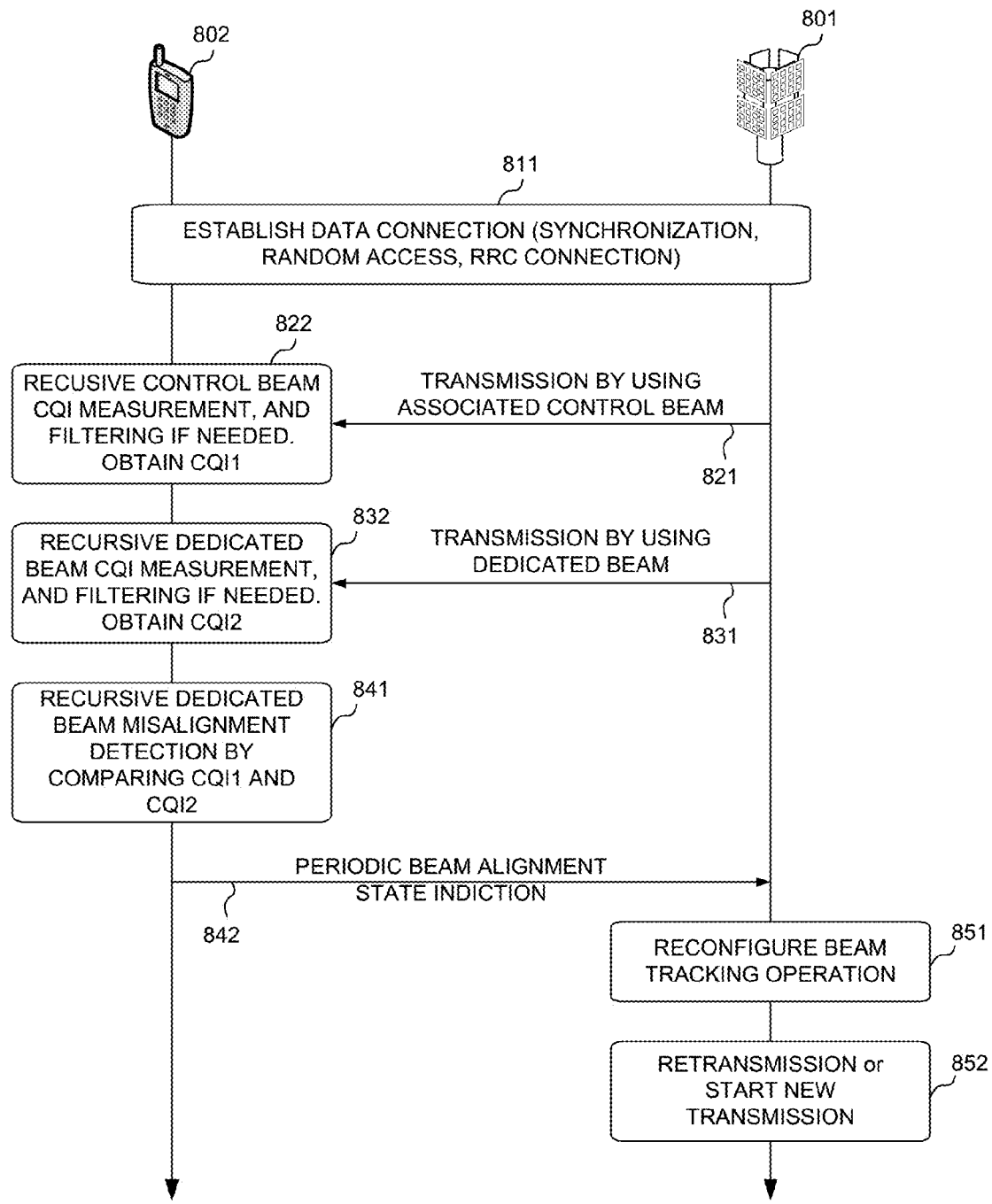
FIG. 8 illustrates one embodiment of beam misalignment detection by a user equipment (UE) in a beamforming system.

FIG. 8 illustrates one embodiment of beam misalignment detection by a user equipment (UE) in a beamforming system. BS 801 is directionally configured with multiple cells, and each cell is covered by a set of coarse TX/RX control beams. Initially, UE 802 performs scanning, beam selection, and synchronization with BS 801 using the control beams. In step 811, BS 801 and UE 802 established a data connection over a trained dedicated data beam based on a beam training operation (after performing synchronization, random access, and RRC connection establishment). In step 821, BS 801 periodically transmits downlink reference signals to UE 802 using an associated control beam. The associated control beam is a beam whose main beam is spatially overlapped with the main beam of the dedicated beam. Based on the control beam transmission, UE 802 recursively monitors and measures the control beam for CQI1 information (step 822). CQI1 may be subject to filtering based on a filtering window to achieve a more representative result. In step 831, BS 801 periodically transmits downlink reference signals to UE 802 over the dedicated beam. Based on the dedicated beam transmission, UE 802 recursively monitors and measures the dedicated beam for CQI2 information (step 832). CQI2 may be subject to filtering based on a filtering window to achieve a more representative result. Note that because control beam is more multipath-rich as compared to dedicated beam, the filtering window for control beam CQI1 is no smaller than the filtering window for dedicated beam CQI2. In step 841, UE 802 recursively performs dedicated beam misalignment detection by comparing the control beam channel quality CQI1 and the dedicated beam channel quality CQI2. In step 842, UE 802 periodically reports beam alignment state indication to BS 801. An uplink signaling means is provided for UE 802 indicating BS 801 of beam alignment state, e.g., via CSI reporting.

Upon receiving the beam alignment state indication, BS 801 can reconfigure the beam tracking operation parameters accordingly (step 851). For example, if beam misalignment does not occur for a long period, then BS 801 may increase the periodicity of beam tracking. On the other hand, if beam misalignment occurs relatively often, then BS 801 may reduce the periodicity of beam tracking. In one preferred operation, once beam misalignment has been detected, an associated control beam can be used as fallback beam for communication. Then, re-alignment of dedicated beam can be performed with modified beam tracking parameter. (The use of the modified beam tracking parameter is because we know that the current parameter is not enough for beam tracking due to the detected beam misalignment.)

Furthermore, if dedicated beam misalignment has been detected and signaled to the BS, BS 801 may adopt different options for any erroneous packet (step 852). In a first option, BS can try retransmission. BS 801 can retransmit the packet after dedicated beam re-aligned (service discontinuity may be experienced). BS 801 can choose redundancy version with as many systematic bits as possible. BS 801 can also retransmit the packet with the associated control beam, and choose redundancy version with as many systematic bits as possible. In a second option, BS can abandon the transmission, and start a new transmission for the packet. Similar to option 1, BS 801 can use the associated control beam or use re-aligned dedicated beam.

Figure 9:
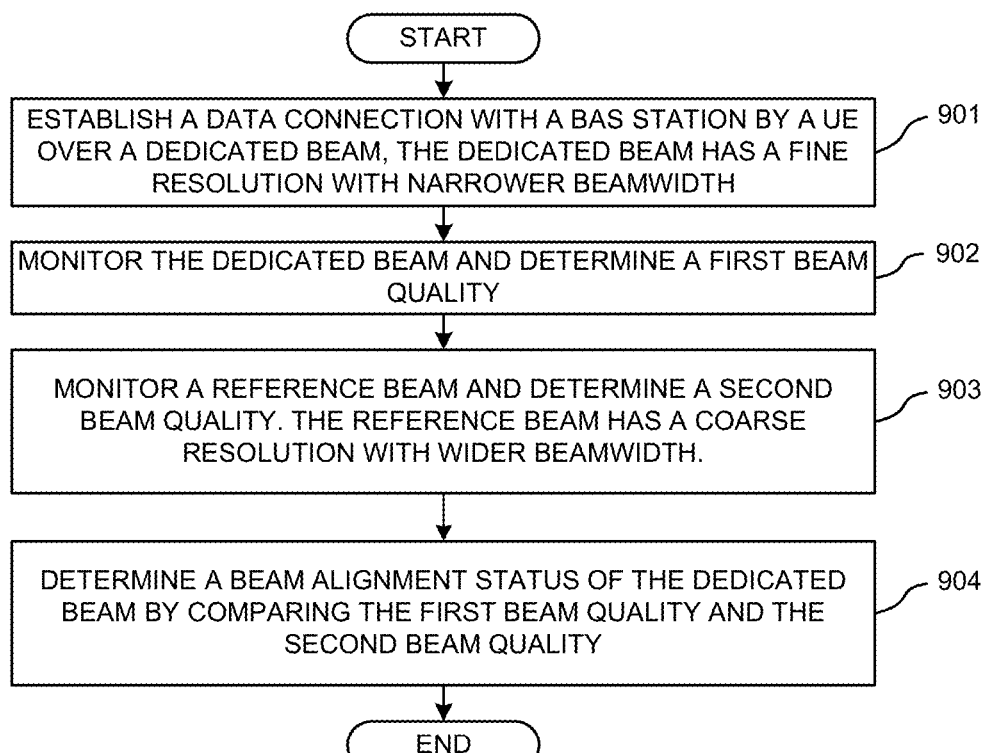
FIG. 9 is a flow chart of a method of beam misalignment detection from UE perspective in a beamforming system in accordance with one novel aspect.

FIG. 9 is a flow chart of a method of beam misalignment detection from UE perspective in a beamforming system in accordance with one novel aspect. In step 901, a UE establishes a connection with a BS over a trained and aligned dedicated beam. The dedicated beam has fine resolution with narrower beamwidth. In step 902, the UE monitors the dedicated beam and determines a first beam quality. In step 903, the UE monitors a reference beam and determines a second beam quality. The reference beam has a coarse resolution with a wider beamwidth. In step 904, the UE determines a beam alignment status of the dedicated beam by comparing the first beam quality and the second beam quality.

Figure 10:
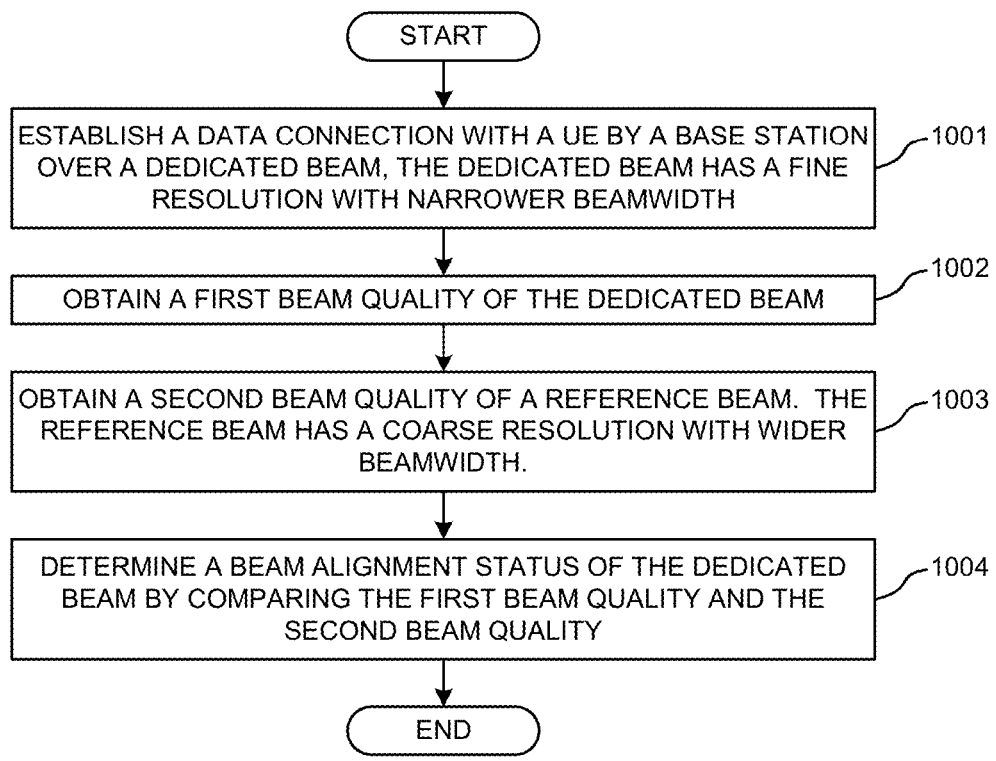
FIG. 10 is a flow chart of a method of beam misalignment detection from BS perspective in a beamforming system in accordance with one novel aspect.

FIG. 10 is a flow chart of a method of beam misalignment detection from BS perspective in a beamforming system in accordance with one novel aspect. In step 1001, a BS establishes a data connection with a UE over a trained and aligned dedicated beam. The dedicated beam has fine resolution with narrower beamwidth. In step 1002, the BS obtains a first beam quality of the dedicated beam. In step 1003, the BS obtains a second beam quality of a reference beam. The reference beam has a coarse resolution with a wider beamwidth. In step 1004, the BS determines a beam alignment status of the dedicated beam by comparing the first beam quality and the second beam quality.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   establishing a data connection with a base station by a user equipment (UE) over a dedicated beam, wherein the dedicated beam has a fine resolution with narrower beamwidth;
   monitoring the dedicated beam and determining a first beam quality, wherein the first beam quality is associated with a signal to interference plus noise ratio (SINR) or a channel quality indicator (CQI) of the corresponding beam channel, and wherein the first beam quality is estimated by applying a first filtering window;
   selecting a reference beam from a plurality of directional beams to be associated with the dedicated beam;
   monitoring the selected reference beam and determining a second beam quality, wherein the reference beam has a coarse resolution with wider beamwidth; and
   determining a beam alignment status of the dedicated beam by comparing the first beam quality and the second beam quality, wherein the second beam quality is estimated by applying a second filtering window, and wherein the first filtering window is equal or smaller than the second filtering window.

2. The method of claim 1, wherein the reference beam is a control beam, and wherein a collection of the control beams covers an entire service area of a cell.

3. The method of claim 1, wherein the dedicated beam is determined to be misaligned if the first beam quality is comparable or lower than the second beam quality.

4. The method of claim 1, wherein the dedicated beam is not determined to be misaligned if both the first beam quality and the second beam quality are below a threshold level.

5. A user equipment (UE), comprising:
   a transceiver that communicates with a base station to establish a connection with the base station over a dedicated beam, wherein the dedicated beam has a fine resolution with narrower beamwidth;
   a beam monitor circuit that monitors the dedicated beam and determining a first beam quality, the beam monitor also monitors a reference beam and determining a second beam quality, wherein the reference beam is selected from a plurality of directional beams to be associated with the dedicated beam, the reference beam has a coarse resolution with wider beamwidth, and wherein each beam quality is associated with a signal to interference plus noise ratio (SINR) or a channel quality indicator (CQI) of the corresponding beam channel; and
   a beam misalignment detector circuit that determines a beam alignment status of the dedicated beam by comparing the first beam quality and the second beam quality, wherein the first beam quality is estimated by applying a first filtering window and the second beam quality is estimated by applying a second filtering window, and wherein the first filtering window is equal or smaller than the second filtering window.

6. The UE of claim 5, wherein the reference beam is a control beam, and wherein a collection of the control beams covers an entire service area of a cell.

7. The UE of claim 5, wherein the dedicated beam is determined to be misaligned if the first beam quality is comparable or lower than the second beam quality.

8. The UE of claim 5, wherein the dedicated beam is not determined to be misaligned if both the first beam quality and the second beam quality are below a threshold level.

9. A method, comprising:
   establishing a data connection with a user equipment (UE) by a base station over a dedicated beam, wherein the dedicated beam has a fine resolution with narrower beamwidth;
   obtaining a first beam quality of the dedicated beam, wherein the first beam quality is associated with a signal to interference plus noise ratio (SINR) or a channel quality indicator (CQI) of the corresponding beam channel, and wherein the first beam quality is estimated by applying a first filtering window;
   obtaining a second beam quality of a reference beam, wherein the reference beam is selected from a plurality of directional beams to be associated with the dedicated beam, the reference beam has a coarse resolution with wider beamwidth; and
   determining a beam alignment status of the dedicated beam by comparing the first beam quality and the second beam quality, wherein the second beam quality is estimated by applying a second filtering window, and wherein the first filtering window is equal or smaller than the second filtering window.

10. The method of claim 9, wherein the reference beam is a control beam, and wherein a collection of the control beams covers an entire service area of a cell.

11. The method of claim 9, wherein the dedicated beam is determined to be misaligned if the first beam quality is comparable or lower than the second beam quality.

12. The method of claim 9, wherein the dedicated beam is not determined to be misaligned if both the first beam quality and the second beam quality are below a threshold level.

13. The method of claim 9, wherein the base station reconfigures the beam tracking operation based on the beam alignment status.

* * * * *